US012755914B2

(12) United States Patent
Zhao et al.

(10) Patent No.: US 12,755,914 B2
(45) Date of Patent: Oct. 6, 2026

(54) THERMAL CUTOFF DEVICE PELLET COMPOSITION

(71) Applicant: Therm-O-Disc, Incorporated, Mansfield, OH (US)

(72) Inventors: Changcai Zhao, Zhuhai (CN); Wei Shi, Zhuhai (CN); Guojun Xiao, Zhuhai (CN); Rong Guan, Zhuhai (CN); Qiang Zhao, Zhuhai (CN); Kangsheng Lin, Zhuhai (CN)

(73) Assignee: Therm-O-Disc, Incorporated, Westerville, OH (US)

( * ) Notice: Subject to any disclaimer, the term of this patent is extended or adjusted under 35 U.S.C. 154(b) by 676 days.

(21) Appl. No.: 18/207,779

(22) Filed: Jun. 9, 2023

(65) Prior Publication Data

US 2023/0420210 A1 Dec. 28, 2023

(30) Foreign Application Priority Data

Jun. 28, 2022 (CN) ......................... 202210740312.0

(51) Int. Cl.
*H01H 37/76* (2006.01)

(52) U.S. Cl.
CPC ..... *H01H 37/764* (2013.01); *H01H 2037/769* (2013.01)

(58) Field of Classification Search
CPC ........................ H01H 37/764; H01H 2037/769
See application file for complete search history.

(56) References Cited

U.S. PATENT DOCUMENTS

2005/0088272 A1* 4/2005 Yoshikawa .......... H01H 37/765 337/401
2013/0334471 A1* 12/2013 Hinrichs .................. H01B 1/12 252/500
2017/0278657 A1* 9/2017 Zhao ...................... H01H 37/32

FOREIGN PATENT DOCUMENTS

EP 1528586 A1 5/2005
JP 2004095524 A 3/2004

OTHER PUBLICATIONS

Extended European Search Report for EP231817131, conducted Nov. 9, 2023.

* cited by examiner

*Primary Examiner* — Jacob R Crum
(74) *Attorney, Agent, or Firm* — Harness, Dickey & Pierce, P.L.C.

(57) ABSTRACT

The present disclosure relates to thermal cutoff device pellet composition. Provided is a pellet composition having enhanced aging performance, electrical performance, pellet output, pellet density and pellet crush strength for use in a thermally-actuated, current cutoff device. The solid thermal pellet composition comprises an organic compound having a low vapor pressure at room temperature, such as tetraphenylsilane. The thermal pellet composition comprising tetraphenylsilane can significantly improve interruption performance, pellet output, pellet density, pellet crush strength and aging performance of the thermal cutoff device.

13 Claims, 2 Drawing Sheets

THERMAL CUTOFF DEVICE PELLET COMPOSITION

FIELD OF THE INVENTION

The present disclosure relates to material compositions for use as pellets in electrical current interruption devices, and more particularly to improved pellet compositions and materials for excellent aging performance and electrical performance, enhanced pellet output, pellet density and pellet crush strength in electrical current interruption devices, or thermal cutoff devices.

BACKGROUND OF THE INVENTION

Temperatures of operation for appliances, electronics, motors and other electrical devices typically have an optimum range. The temperature range where damage can occur to system components or where the device becomes a potential hazard is an important detection threshold. Various devices are capable of sensing such over-temperature thresholds. Certain devices are capable of sensing over-temperature conditions and interrupting electrical current, including electrical thermal fuses, which only operate in a narrow temperature range. For example, tin and lead alloys, indium and tin alloys, or other metal alloys that form a eutectic metal, may be unsuitable for appliance, electronic, electrical and motor applications due to undesirably broad temperature response thresholds and/or detection temperatures that are outside a desired range.

One type of device particularly suitable for over-temperature detection is an electrical current interruption device, known as a thermal cut-off device (TCO), which is capable of temperature detection and simultaneous interruption of current, when necessary. Such TCO devices are typically installed in an electrical application between the current source and electrical components, such that the TCO is capable of interrupting the circuit continuity in the event of a potentially harmful or dangerous over-temperature condition. Conventional thermal cutoff compounds for 240 C TCO (cutoff temperature of about 240° C.) have higher vapor pressures at room temperature. There is a strong positive correlation between vapor pressure and ambient temperature. When the ambient temperature increases, the current compounds sublime more rapidly, thereby adversely affecting the aging performance of the TCO. In addition, when excessively sublimated chemicals accumulate on the TCO contacts, it may adversely affect the electrical performance of the TCO, for example leading to current interruption (CI) performance failure.

SUMMARY OF THE INVENTION

This section provides a general summary of the disclosure, and is not a comprehensive disclosure of its full scope or all of its features.

In certain aspects, the present disclosure provides a pellet composition for use in a thermally actuated, current cutoff device. The pellet composition comprises an organic component having a low vapor pressure. In certain variations, the pellet composition comprises tetraphenylsilane. Such a pellet composition is in a solid phase and maintains its structural rigidity up to a cutoff temperature ($T_f$). In certain variations, the cutoff temperature ($T_f$) may be greater than or equal to about 230° C.

In other aspects, the present disclosure provides a thermal cutoff device that comprises a thermal pellet disposed in a housing. The thermal pellet composition comprises an organic component with a lower vapor pressure. In certain variations, the thermal pellet composition comprises tetraphenylsilane. Such a thermal pellet composition is in a solid phase and maintains its structural rigidity up to a cutoff temperature ($T_f$). In certain variations, the cutoff temperature ($T_f$) may be greater than or equal to about 230° C. A seal is disposed in a portion of at least one opening of the housing to substantially seal the housing up to the cutoff temperature. The thermal cutoff device further comprises a current interruption assembly at least partially disposed within the housing that establishes electrical continuity in a first operating condition corresponding to an operating temperature of less than the cutoff temperature of the thermal pellet, and that discontinues electrical continuity when the operating temperature exceeds the cutoff temperature.

In yet other aspects, the present disclosure also provides methods for making a thermal pellet composition for use in a thermally actuated, current cutoff device. The method may comprise admixing tetraphenylsilane and one or more additive components selected from the group consisting of: binders, lubricants, press-aids, pigments, and combinations thereof to form an admixture. The admixture is melted and then cooled. After crushing the bulky cooled material, it is sieved to form a powder having a relatively uniform particle size. Then, the powder is disposed in a die and pressure is applied to the powder to form a solid pellet.

The thermally cutoff pellet composition comprising tetraphenylsilane of the present disclosure can be used in 240 C TCO. The thermally cutoff pellet composition comprising tetraphenylsilane of the present disclosure has excellent flowability during pelletizing process, contributing to achieving a higher pellet density and maintaining stable structure under pressure in TCO. Thus, the current interruption performance and aging performance of the 240 C TCO device can be significantly improved, and the pellet output, pellet density and pellet crushing strength can be significantly improved.

Certain aspects of the present invention provide a pellet composition for thermal cutoff device, the pellet composition comprising tetraphenylsilane.

In certain aspects, the pellet composition comprises tetraphenylsilane at greater than or equal to about 80% by weight based on a total pellet composition.

In certain aspects, the pellet composition is in a solid phase and maintains its structural rigidity up to a cutoff temperature ($T_f$) which is greater than or equal to about 230° C.

In certain aspects, the cutoff temperature is less than or equal to about 240° C.

In certain aspects, the pellet composition further comprises one or more additive components selected from the group consisting of: binders, lubricants, press-aids, pigments, and combinations thereof, wherein the one or more additive components are cumulatively present at less than or equal to about 20% by weight.

In certain aspects, the binders are present at about 1% to about 10% by weight based on the total pellet composition.

In certain aspects, the pellet composition comprises tetraphenylsilane at greater than or equal to about 90% by weight based on the total pellet composition.

In certain aspects, the pellet composition has a output of greater than or equal to about 16 kpcs/hour.

In certain aspects, the pellet composition has a crush strength of greater than or equal to about 13 lbs.

Other aspects of the present invention provide a thermal cutoff device comprising: a thermal pellet comprising tetraphenylsilane having a cutoff temperature ($T_f$) of greater than or equal to about 230° C. disposed in a housing; a seal disposed in a portion of at least one opening of the housing to substantially seal the housing up to the Tf; and a current interruption assembly at least partially disposed within the housing that establishes electrical continuity in a first operating condition corresponding to an operating temperature of less than the cutoff temperature of the thermal pellet, and that discontinues electrical continuity when the operating temperature exceeds the cutoff temperature.

In certain aspects, the thermal cutoff device exhibits an aging performance by avoiding failure for greater than or equal to about 8 weeks.

In certain aspects, the thermal cutoff device exhibits an aging performance by avoiding failure for greater than or equal to about 20 weeks.

In certain aspects, the thermal pellet comprises tetraphenylsilane at greater than or equal to about 80% by weight based on a total thermal pellet and one or more additive components cumulatively present at less than or equal to about 20% by weight based on the total thermal pellet.

In certain aspects, the thermal cutoff device has an interruption current greater than or equal to 15 A at TCO rating G4/240 C, and an interruption current greater than or equal to 30 A at TCO rating G5/240 C.

Yet other aspects of the present invention provide a method for forming a pellet composition for use in a thermally-actuated, current cutoff device, the method comprising: admixing tetraphenylsilane and one or more additive components selected from the group consisting of: binders, lubricants, press-aids, pigments, and combinations thereof to form an admixture; melting and then cooling the admixture; grinding the admixture to form a powder; and disposing the powder in a die and applying pressure to the powder to form a compacted solid pellet.

In certain aspects, the method is repeated to form a plurality of compacted solid pellets and a final yield of the method is greater than or equal to about 95%.

In certain aspects, the compacted solid pellet has a crush strength of greater than or equal to about 13 lbs.

In certain aspects, the compacted solid pellet comprises tetraphenylsilane at greater than or equal to about 80% by weight and the one or more additive components cumulatively present at less than or equal to about 20% by weight based on the compacted solid pellet.

In certain aspects, a density of the compacted solid pellet is 29 pellets per gram to 50 pellets per gram.

The description and specific examples in this summary are intended for purposes of illustration only and are not intended to limit the scope of the present disclosure.

DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE INVENTION

Figure 1:
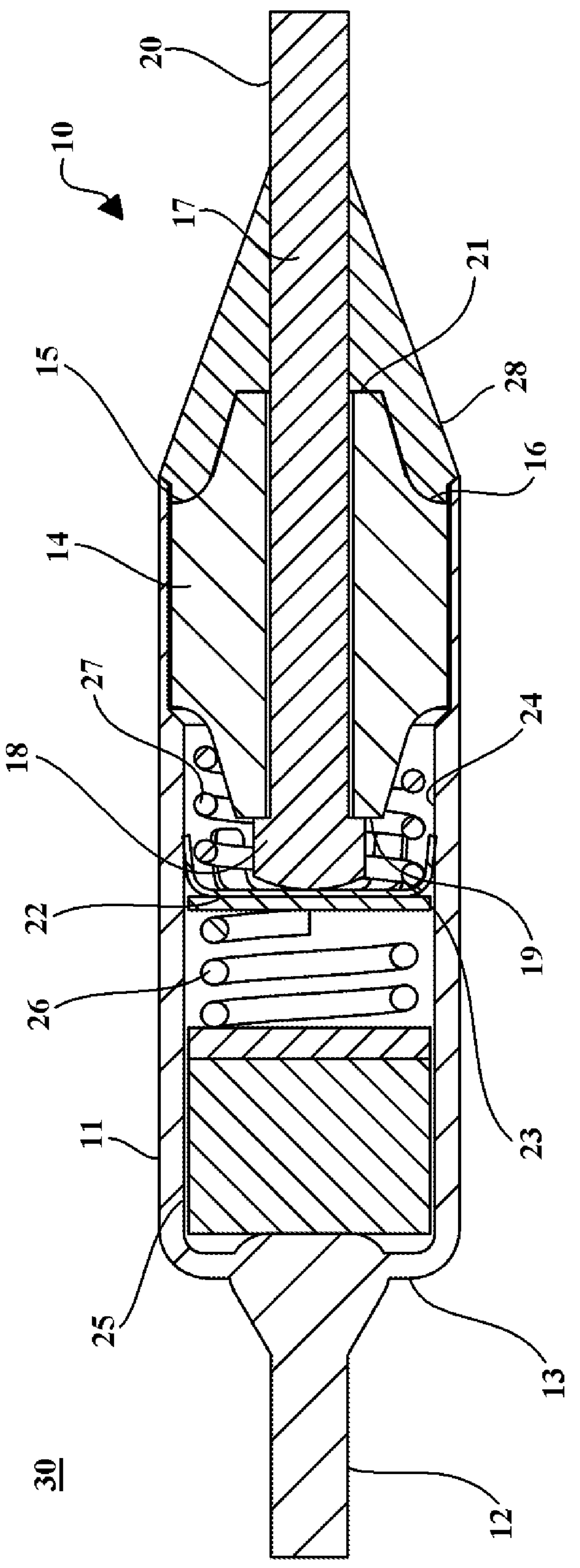
FIG. 1 is an enlarged cross sectional view of an exemplary conventional thermal cutoff device construction.

Example embodiments are provided so that this disclosure will be thorough, and will fully convey the scope to those skilled in the art. Numerous specific details are set forth below such as examples of specific components, devices, and methods, to provide a thorough understanding of embodiments of the present disclosure. Example embodiments may be embodied in many different forms without employing specific details, and neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s). Spatially relative terms may be intended to encompass different orientations of the device in use or operation in addition to the orientation depicted. For example, if the device is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

Example embodiments will now be described more fully with reference to the accompanying drawings. Various electrical current interruption devices, including thermal cut-off devices ("TCOs") are used as devices in a broad range of application temperatures. The TCOs are incorporated into an electrical device, such an appliance, motor, or consumer device, and serve as a device by breaking or interrupting electrical current above a threshold temperature or temperature rating, typically ranging from about 60° C. up to about 235° C. The term "TCO" encompasses both conventional TCO devices and their high-temperature counterparts (HTTCOs). The present disclosure relates to improved pellet compositions having enhanced pellet output, pellet density and pellet crush strength for use in thermal cutoff devices having excellent aging performance and electrical performance.

An exemplary conventional TCO device is described herein, as set forth in FIG. 1. In general, a conventional TCO 10 comprises a conductive metallic housing (or casing) 11 having a first metallic electrical conductor 12 in electrical contact with a closed end 13 of the housing 11. An isolation bushing 14, such as a ceramic bushing, is disposed in an opening 15 of the housing 11. Housing 11 further comprises a retainer edge 16, which secures the ceramic bushing 14 within the end of the housing 11. An electric current interrupter assembly for actuating the device in response to a high temperature, for example, by breaking continuity of an electrical circuit, comprises an electric contact 17, such as a metallic electrical conductor, at least partially disposed within the housing 11 through opening 15. Electric contact 17 passes through isolation bushing 14 and has an enlarged terminal end 18 disposed against one side 19 of isolation bushing 14 and a second end 20 projecting out of the outer end 21 of isolation bushing 14.

A seal 28 is disposed over the opening 15 and can create sealing contact with the housing 11 and its retainer edge 16, the isolation bushing 14, and the exposed portion of the second end 20 of electric contact 17. In this manner, an interior portion 29 of the housing 11 is substantially sealed from the external environment 30. By "substantially sealed" it is meant that while the barrier seal is optionally porous at a microscopic level, the barrier is capable of preventing escape or significant mass loss of the thermal pellet material, for example, the seal retains at least about 98-99% of the mass of the initial thermal pellet through 1,000 hours of continuous operation at a predetermined temperature within the housing, in certain variations.

Figure 3A:
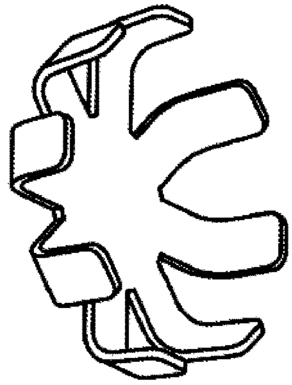
FIGS. 3A and 3B are a side view and side perspective view, respectively, of a sliding contact member of the current interruption actuating assembly switch construction of FIG. 1.
Figure 3B:
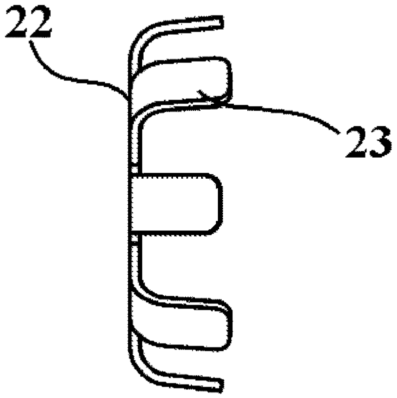

The current interruption assembly, which actuates or switches to change continuity of an electrical circuit, further comprises a sliding contact member 22, formed of electrically conductive material, such as a metal, which is disposed inside the housing 11 and has resilient peripheral fingers 23 (FIGS. 3A and 3B) disposed in sliding engagement with the internal peripheral surface 24 of the housing 11 to provide electrical contact there between. Moreover, when the TCO has an operating temperature that is below the predetermined threshold or set-point temperature of the TCO device, the sliding contact member 22 is disposed in electrical contact with the terminal end 18 of electric contact 17.

Current interruption assembly also comprises a compression mechanism, which may include a plurality of distinct compression mechanisms. The compression mechanism biases the sliding contact member 22 against the terminal end 18 of electric contact 17 to establish electrical contact in the first operating condition (where operating temperatures are below the threshold temperature of the TCO device, as will be described below). As shown in FIG. 1, the compression mechanism comprises a pair of springs, which are respectively disposed on opposite sides of the sliding contact member 22. The springs include a relatively strong compression spring 26 and a relatively weak compression trip spring 27.

Figure 2:
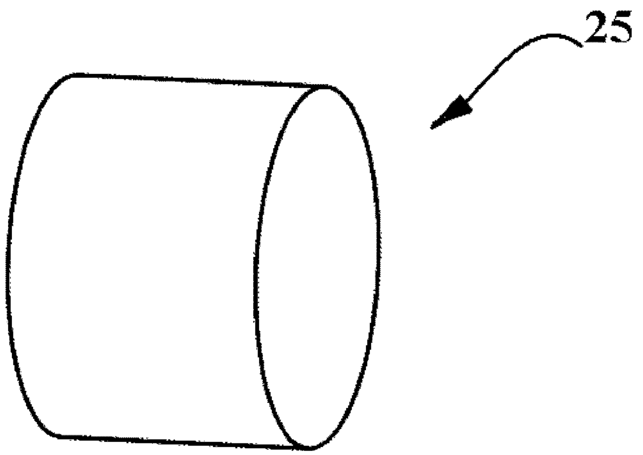
FIG. 2 is a side perspective view illustrating a thermally pellet according to certain aspects of the present disclosure.

A thermally responsive pellet or thermal pellet 25, as illustrated in FIG. 2, is disposed in the housing 11 against the end wall 13 thereof. The compression spring 26 is in a compressed state between the solid thermal pellet 25 and the sliding contact member 22 and in the exemplary design shown, generally has a stronger compressed force than the force of the compressed trip spring 27, which is disposed between the contact member 22 and the isolation bushing 14, such that the sliding contact member 22 is biased towards (e.g., held by the force of the spring 26) and in electrical contact with the enlarged end 18 of the electrical contact 17. In this manner, an electrical circuit is established between the first electrical conductor 12 and electrical contact 17 through the conductive housing 11 and sliding contact member 22.

As noted above, the TCO device is designed to comprise a thermal pellet 25 that comprises a pellet composition in a solid phase that is reliably stable in the first operating condition (where the operating temperature, for example, the temperature of the surrounding environment 30, is below a threshold temperature); however reliably transitions to a different physical state when the operating temperature meets or exceeds such a threshold temperature in a second operating condition. Thus, the pellet composition that forms thermal pellet 25 is in a solid phase and maintains its structural rigidity up to a threshold or cutoff temperature ($T_f$), at which point internal contact breaks continuity due to structural changes in the pellet material composition, which in turn causes relaxing or opening of compression mechanisms, for example. When the operating temperature meets or exceeds the cutoff temperature $T_f$, the thermal pellet melts, liquefies, softens, volatilizes, sublimates, or otherwise transitions to a different physical state to transform from a solid having structural rigidity to a form or phase that loses structural rigidity, either by contraction, displacement, or other physical changes, during an adverse heating condition. When the surrounding environment reaches the cutoff temperature ($T_f$), and the pellet loses structural rigidity, it causes the internal electrical contacts to separate due to the applied force from the expanding trip spring 27. In certain alternative device configurations, the device may remain electrically closed after activation.

Figure 4:
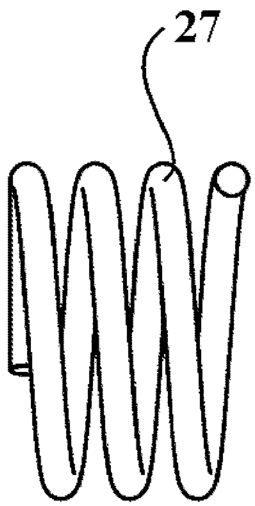
FIG. 4 is a side view of one of the springs of the current interruption actuating assembly of FIG. 1.

The springs 26 and 27 are adapted to expand and relax, as illustrated by expanded trip spring 27 in FIG. 4, and through the relationship of the particular forces and length of the compression spring 26 and compression trip spring 27, the sliding contact member 22 is moved out of electrical contact with the end 18 of the electric contact 17, so that the electrical circuit between the terminal conductor 12 and electrical contact 17 through the thermal cutoff construction 10 (via the housing 11 and sliding contact member 22) is discontinued and broken. The thermal cutoff device described in the present disclosure is used for purposes of illustration, is exemplary and therefore should not be construed to necessarily be limiting. In certain aspects, various components, designs, or operating principles may be varied in number or design. Various other thermal switching or cutoff devices are known in the art.

As described above, in various aspects, pellet material compositions are designed to permit the TCO device to have a cutoff temperature ($T_f$), where activation within the device can break internal contacts due to structural changes in the pellet material composition. Thus, the pellet composition is in a solid phase and maintains its structural rigidity up to a cutoff temperature ($T_f$), at which point, a switch in continuity is activated due to structural transitioning or breakdown of the solid thermal pellet. Once the pellet material composition reaches its cutoff temperature ($T_f$), it means that the material no longer possesses the structural integrity required to maintain a compression mechanism, such as a switch in a held-closed position, depending on the TCO device, for example. This cutoff temperature ($T_f$) can also be referred to as a "melting-point" and provides the TCO device rating; however, the compounds in the pellet composition need not fully melt in a conventional sense to achieve separation of the electrical contacts to break the internal circuit and electrical continuity.

In certain preferred aspects, the thermal pellet composition of the present disclosure comprises tetraphenylsilane (CAS No.: 1048-08-4; EC No.: 213-881-3; C24H20Si; melting point: about 235.0° C. to 238.0° C.), whose structure is shown below.

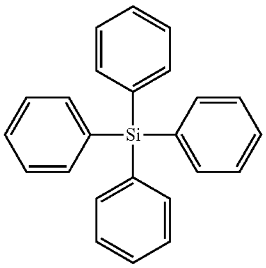 [SMILES: c1ccc([Si](c2ccccc2)(c2ccccc2)c2ccccc2)cc1]

As compared to a conventional thermal cutoff pellet composition, the inventive thermal cutoff pellet composition comprising tetraphenylsilane significantly increases the pellet output, pellet density and pellet crush strength of the thermal pellet composition, and improves the aging performance and electrical performance of the thermal cutoff device using the inventive thermal cutoff pellet composition comprising tetraphenylsilane.

As discussed further below, the tetraphenylsilane has a relatively low vapor pressure, as compared to conventional organic compounds used in conventional thermal cutoff pellets. Conventional thermal cutoff compounds for 240 C TCO (cutoff temperature of about 240° C.) have higher vapor pressures at room temperature. There is a strong positive correlation between vapor pressure and ambient temperature. When the ambient temperature increases, the conventional compounds sublime more rapidly, adversely affecting the aging performance of the TCO. In addition, when excessively sublimated chemicals accumulate on the TCO contacts, it may adversely affect the electrical performance of the TCO, for example leading to current interruption (CI) performance failure.

The pellet material compositions may comprise an organic compound, such as tetraphenylsilane, which is selected to meet one or more of the following criterion. In certain aspects, a compound or organic compound selected for use in the thermal pellet has a relatively high chemical purity. For example, in certain embodiments, chemicals used for the high temperature thermal pellet compositions have a range of purity levels greater than or equal to about 95%, preferably greater than or equal to about 98%, more preferably greater than about 99%. In certain aspects, the organic compositions and any additives selected for use in the thermal pellet compositions are particularly suitable for processing, handling, and toxicity characteristics. In certain embodiments, the organic chemical compounds or compositions selected for use in the pellet compositions have a median lethal dose toxicity value (LD50) less than or equal to about 220 mg/kg (ppm) for a mouse; less than or equal to about 400 mg/kg (ppm) for a rabbit; and less than or equal to about 350 mg/kg (ppm) for a rat. Further, in certain aspects, the selected organic chemical compound and any additive compositions for the component compound desirably do not have documented carcinogenicity effects, mutagenicity effects, neurotoxicity effects, reproductive effects, teratogenicity effects, and/or other harmful health or epidemiological effects. In yet other aspects, the at least one organic compound and at least one inorganic stability additive particle for the pellet material compositions are selected such that alternate reactive residuals, reaction products formed during manufacture, decomposition products, or other species that might be formed during manufacture, storage, or use are absent, minimized, or are capable of purification and removal of such undesired species.

In various aspects, the TCO pellet composition material comprises one or more organic compounds, including tetraphenylsilane, cumulatively present at greater than or equal to about 80% by weight of the total pellet composition. For example, in certain embodiments, the one or more organic compounds can be a single organic compound, such as tetraphenylsilane, that is present at greater than or equal to about 80% by weight, optionally greater than or equal to about 85% by weight, optionally greater than or equal to about 90% by weight, optionally greater than or equal to about 95% by weight, optionally greater than or equal to about 96% by weight, optionally greater than or equal to about 97% by weight, optionally greater than or equal to about 98% by weight, optionally greater than or equal to about 98.5% by weight, optionally greater than or equal to about 99% by weight, optionally greater than or equal to about 99.1% by weight, and in certain aspects, greater than or equal to about 99.2% by weight organic compounds in the total pellet material composition. In addition, in certain aspects, the one or more organic compounds, such as tetraphenylsilane, may be present at less than or equal to 100% by weight of the organic compound in the total pellet material composition, less than or equal to 99% by weight of the organic compound in the total pellet material composition, less than or equal to 95% by weight of the organic compound in the total pellet material composition, less than or equal to 90% by weight of the organic compound in the total pellet material composition, and in certain aspects, less than or equal to 85% by weight of the organic compound in the total pellet material composition. In certain aspects, the organic compound(s) or chemical(s), including tetraphenylsilane, are processed to minimize evaporative loss, enhance crystallinity, and to obtain high purity levels.

The tetraphenylsilane can be mixed with various additive ingredients to form a mixture. Therefore, in addition to the one or more organic compounds, including tetraphenylsilane, the thermal pellet composition optionally comprises one or more conventional pellet composition components selected from the group consisting of: binders, lubricants, press-aids, release agents, pigments, and combinations thereof, by way of example. These additives can be mixed with the organic compound(s), including tetraphenylsilane. In certain aspects, the one or more components are cumulatively present at less than or equal to about 20% by weight of the total pellet composition, optionally less than or equal to about 15% by weight of the total pellet composition, optionally less than or equal to about 10% by weight of the total pellet composition, optionally less than or equal to about 7% by weight of the total pellet composition, optionally less than or equal to about 5% by weight of the total pellet composition, and in certain aspects, optionally less than or equal to about 3% by weight of the total pellet composition. In addition, in certain aspects, the one or more components are cumulatively present at greater than or equal to about 1% by weight of the total pellet composition, optionally greater than or equal to about 2% by weight of the total pellet composition, optionally greater than or equal to about 3% by weight of the total pellet composition, optionally greater than or equal to about 5% by weight of the total pellet composition, optionally greater than or equal to about 7% by weight of the total pellet composition, and in certain aspects, optionally greater than or equal to about 10% by weight of the total pellet composition. The balance of the thermal pellet composition may thus comprise the tetraphenylsilane organic compound.

In the above additives, the binder may be present at less than or equal to about 10% by weight of the total pellet composition, optionally less than or equal to about 7% by weight of the total pellet composition, optionally less than or equal to about 5% by weight of the total pellet composition, and in certain aspects, optionally less than or equal to about 3% by weight of the total pellet composition. In addition, the binder may be present at greater than or equal to about 1% by weight of the total pellet composition, optionally greater than or equal to about 2% by weight of the total pellet composition, optionally greater than or equal to about 3% by weight of the total pellet composition, and in certain aspects, optionally greater than or equal to about 5% by weight of the total pellet composition. For example, in certain aspects, the binder may be present at about 1% by weight to about 10% by weight of the total pellet composition.

In the above additives, the additives other than the binder may be present at less than or equal to about 10% by weight of the total pellet composition, optionally less than or equal to about 7% by weight of the total pellet composition, optionally less than or equal to about 5% by weight of the total pellet composition, and in certain aspects, optionally less than or equal to about 3% by weight of the total pellet composition. In addition, the binder may be present at greater than or equal to about 1% by weight of the total pellet composition, optionally greater than or equal to about 2% by weight of the total pellet composition, optionally greater than or equal to about 3% by weight of the total pellet composition, and in certain aspects, optionally greater than or equal to about 5% by weight of the total pellet composition.

A binder component, which generally softens (melts) at a temperature below the melting point of the organic component, is primarily utilized to assist in the production of pellets. While various binders known for pellet formation can be utilized, suitable binders include Dow Chemical D.E.R. 663U Epoxy Powder, polyethylene glycol, 1,3-benzenediol, epoxies, polyamides and combinations thereof, by way of non-limiting example. The binder is generally present in amounts of less than or equal to about 10% by weight based on the total composition, optionally at greater than or equal to about 1% by weight to less than or equal to about 5% by weight of the total composition.

Additionally, it may be desirable to employ a lubricant, release agent, or pressing aid to contribute to flowing and fill properties (into a die) when processing the thermal pellets. For example, among the numerous lubricants or press aids that have proven useful are calcium stearate, boron nitride, magnesium silicate and polytetrafluoroethylene (Teflon®), among others. The lubricant is generally present in an amount up to about 5% by weight based on the total pellet composition. In certain aspects, the inventive pellet compositions comprising tetraphenylsilane minimize or avoid the need to comprise lubricants, due to enhanced flow and processing properties. Thus, in certain variations, the pellet composition is substantially free or entirely free of any lubricants or press-aids.

It may also be desirable in certain variations to incorporate colorants, such as pigments, into the pellet composition to allow for rapid visual inspection of pellet condition. Various well-known pigments are compatible with the aforementioned thermal cutoff composition components and temperatures at which they operate may be employed. Pigments, when employed, are typically present in an amount up to about 2% by weight of the total pellet composition.

In certain embodiments, the pellet composition may consist essentially or solely of the tetraphenylsilane and one or more additive components selected from the group consisting of: binders, lubricants, press-aids, pigments, and combinations thereof. In certain other embodiments, the pellet composition may consist essentially or solely of the tetraphenylsilane and one or more additive components selected from the group consisting of: binders, pigments, and combinations thereof.

Thus, the pellet composition may consist essentially of a single organic composition, tetraphenylsilane (as the primary ingredient to arrive at a predetermined, desired cutoff temperature $T_f$ and the improved aging performance, electrical performance, pellet output, pellet density and pellet crush strength), and optionally one or more components selected from the group consisting of: binders, press aids, release agents, pigments, or other conventional TCO pellet composition additives or diluents that do not impact the functional properties of the pellet. Such a pellet composition may comprise minimal amount of diluents or impurities that do not substantially affect the cutoff temperature of the pellet composition or the performance of the TCO at operating temperatures above the cutoff temperature.

In certain embodiments, the pellet composition of the present disclosure may have an output of greater than or equal to about 16 kpcs (1,000 pieces)/hour. In certain aspects, the pellet composition optionally has an output of greater than or equal to about 17 kpcs (1,000 pieces)/hour, optionally greater than or equal to about 18 kpcs (1,000 pieces)/hour, optionally greater than or equal to about 19 kpcs (1,000 pieces)/hour, optionally greater than or equal to about 20 kpcs (1,000 pieces)/hour, optionally greater than or equal to about 21 kpcs (1,000 pieces)/hour, optionally greater than or equal to about 22 kpcs (1,000 pieces)/hour.

In certain embodiments, the pellet composition of the present disclosure may have a crush strength of greater than or equal to about 12 lbs. In certan aspects, the pellet composition has a crush strength of greater than or equal to about 13 lbs, optionally greater than or equal to about 14 lbs, optionally greater than or equal to about 15 lbs.

In certain embodiments, the present disclosure relates to a method for forming a pellet composition for use in a thermally-actuated, current cutoff device, the method comprising: admixing tetraphenylsilane and one or more additive components selected from the group consisting of: binders, lubricants, press-aids, pigments, and combinations thereof to form an admixture; melting and then cooling the admixture; grinding the admixture to form a powder; and disposing the powder in a die and applying pressure to the powder to form a compacted solid pellet.

In certain aspects, the method for admixing tetraphenylsilane and additive components to form an admixture is not particularly limited. The admixing methods known in the art can be used. The method for melting and cooling the admixture is not particularly limited. The melting and cooling methods known in the art can be used. The method for compacting the powder is not particularly limited. The compacting methods known in the art can be used.

In certain aspects, the method for forming a pellet composition for use in a thermally-actuated, current cutoff device of the present disclosure is repeated to form a plurality of compacted solid pellets. In certain aspects, the method for forming a pellet composition for use in a thermally-actuated, current cutoff device of the present disclosure may have a final yield of greater than or equal to about 90%, optionally greater than or equal to about 92%, optionally greater than or equal to about 95%, optionally greater than or equal to about 97%, optionally greater than or equal to about 98%, optionally greater than or equal to about 99%, optionally greater than or equal to about 99.5%, optionally greater than or equal to about 99.9%.

In certain aspects, the compacted solid pellet formed by the method for forming a pellet composition for use in a thermally-actuated, current cutoff device of the present disclosure may have a density of about 29 pellets per gram to about 50 pellets per gram. In certain aspects, the compacted solid pellet of the present disclosure has a density of greater than or equal to about 32 pellets per gram, optionally greater than or equal to about 35 pellets per gram, optionally greater than or equal to about 38 pellets per gram, optionally greater than or equal to about 40 pellets per gram, optionally greater than or equal to about 42 pellets per gram, optionally greater than or equal to about 45 pellets per gram. In certain aspects, the compacted solid pellet of the present disclosure has a density of less than or equal to about 48 pellets per gram, optionally less than or equal to about 44 pellets per gram, optionally less than or equal to about 41 pellets per gram, optionally less than or equal to about 37 pellets per gram, optionally less than or equal to about 33 pellets per gram, optionally less than or equal to about 30 pellets per gram.

In various aspects, the thermal cutoff devices of the present disclosure comprises a sealed housing having disposed therein a pellet material composition having an cutoff temperature $T_f$ or melting point of greater than or equal to about 220° C., optionally greater than or equal to about 225° C., optionally greater than or equal to about 230° C., optionally greater than or equal to about 235° C., optionally greater than or equal to about 236° C., optionally greater than or equal to about 237° C., optionally greater than or equal to about 238° C., and in certain aspects, greater than or equal to about 239° C. In certain aspects, the pellet material composition has an cutoff temperature of less than or equal to about 240° C.

This cutoff temperature $T_f$ can also be referred to as a "melting-point". However, the compounds in the pellet composition need not fully melt in a conventional sense to achieve separation of the electrical contacts to break the internal circuit and electrical continuity. As recognized by those skilled in the art, a melting-point temperature is one where compounds or compositions transform from solid to liquid phase, which may occur at a range of temperatures, rather than at a single discrete temperature point. In certain aspects, the high temperature thermal pellet may soften or sublimate rather than melting, by way of non-limiting example, to achieve the separation of electrical contacts to break the circuit. Melting-point temperatures can be measured in various apparatuses, such as those produced by Thomas Hoover, Mettler and Fisher-Johns companies. Differential Scanning calorimetry (DSC) techniques are also commonly used. Different measurement techniques may result in differing melting points, for example, optical analysis methods like Fisher-Johns measure light transmittance through a sample, a solid to liquid phase change. Early optical methods potentially suffered greater observer error versus more modern light beam transmittance melt point indicators. In addition, earlier techniques to determine melting point (before the use of digital high-speed scan capabilities), rendered a broader range of results for melt points and other transitions. Likewise, before the advent of HPLC and other precise analytical techniques for determination of purity, the melt point of a sample, for example, measured by DSC, which measures heat flow behavior for example, crystallinity (solid-solid phase) changes as well as, solid to liquid phase changes, could show the solid-solid phase change of an impurity that may have been reported as a melt point, such as dehydration or breaking of hydroxyl bonds, as well as the solid-liquid phase change at the melt point for the material of interest. Thus, in various aspects, a composition can be selected for use in the thermal pellet that empirically exhibits a desirable physical change that will enable a pellet's physical transition without necessarily correlating to the predicted melting point ranges.

The pellet material composition thus comprises at least one organic compound, such as tetraphenylsilane, which generally has a melting point or melting point range near the pre-selected or desired cutoff temperature.

The thermal cutoff device comprising such a pellet material composition can optionally have a seal disposed in a portion of at least one opening of the housing that substantially seals the housing up to the cutoff temperature of the pellet material composition. As discussed above, the thermal cutoff device may also comprise a current interruption assembly that is at least partially disposed within the housing. The current interruption assembly establishes electrical continuity in a first operating condition of the thermal cutoff device, which corresponds to an operating temperature of less than the cutoff temperature ($T_f$) of the pellet material composition, and discontinues electrical continuity when the operating temperature exceeds the cutoff temperature ($T_f$).

In certain aspects, the compositions selected for use in the pellet material composition exhibit long-term stability. By way of example, compositions are optionally selected to possess temperature or thermal stability, in other words, chemical compounds that show high levels of decomposition or volatility behavior within about 10° C., optionally within about 20° C., optionally within about 30° C., optionally within about 40° C., optionally within about 50° C., optionally within about 60° C., optionally within about 75° C., and in certain aspects, optionally within about 100° C. of the cutoff temperature $T_f$ or melting point of the organic compound may be rejected as viable candidates. The inclusion of the tetraphenylsilane enhances the long-term stability of the pellet composition.

In certain alternative aspects, the present disclosure provides methods for enhancing performance of a pellet composition for use in a thermally actuated, current cutoff device. Such a method may comprise forming a pellet composition comprising tetraphenylsilane, where the pellet composition maintains its structural rigidity up to a cutoff temperature ($T_f$). The improved pellet composition exhibits the same $T_f$ as a comparative pellet composition, but has improved aging performance.

For example, in certain variations, the improved aging performance may be determined by conducting an aging test below the cutoff temperature on a thermal cutoff device using the inventive pellet composition. In certain aspects, TCO devices using conventional pellet compositions start to open and thus fail at 6 weeks. However, the pellet compositions comprising tetraphenylsilane tested under the same conditions do not open or fail until after 20 weeks.

Thus, in certain aspects, a thermal cutoff device incorporating a pellet composition comprising tetraphenylsilane has an aging performance that the tested devices do not open (and thus fail) after greater than or equal to about 8 weeks, optionally the tested devices do not open after greater than or equal to about 10 weeks, optionally the tested devices do not open after greater than or equal to about 12 weeks, optionally the tested devices do not open after greater than or equal to about 14 weeks, optionally the tested devices do not open after greater than or equal to about 16 weeks, optionally the tested devices do not open after greater than or equal to about 18 weeks, and optionally the tested devices do not open after greater than or equal to about 20 weeks, Thus, in certain aspects, a thermal cutoff device comprising a pellet composition according to the present disclosure exhibits an improved aging performance by avoiding failure (and opening) for greater than or equal to about 8 weeks, optionally by avoiding failure for greater than or equal to about 20 weeks.

In certain embodiments, the thermal cutoff device comprising the pellet composition of the present disclosure has excellent electrical performances. In certain aspects, the thermal cutoff device comprising the pellet composition of the present disclosure has an interruption current greater than or equal to 15 A at TCO rating G4/240 C, optionally greater than or equal to 16 A, optionally greater than or equal to 17 A, optionally greater than or equal to 18 A, optionally greater than or equal to 19 A. In certain aspects, the thermal cutoff device comprising the pellet composition of the present disclosure has an interruption current greater than or equal to 30 A at TCO rating G5/240 C, optionally greater than or equal to 32 A, optionally greater than or equal to 34 A, optionally greater than or equal to 36 A, optionally greater than or equal to 37.5 A.

In certain aspects, the inventive pellet compositions comprising tetraphenylsilane may exhibit a slower rate of aging at a temperature below the $T_f$ of at least 2% as compared to a conventional pellet composition, optionally the rate of aging may be slowed by at least 3% or more; optionally at least 4% or more; and in certain aspects 5% or more. The rate of aging may be tested at various different temperatures below the cutoff temperature $T_f$, as are well known in the art and described further below in the examples. Typical rates of aging can be tested at a temperature of $T_f$-40° C., $T_f$-25° C., $T_f$-20° C., $T_f$-15° C., $T_f$-10° C., or $T_f$-6° C., by way of non-limiting example. The slowed rate of aging and thermal stability conferred by certain aspects of the present teachings is particularly noticeable at higher temperatures near the $T_f$, such as at $T_f$-15° C. and $T_f$-10° C.

An illustrative test to demonstrate performance of a pellet composition, for example to assess dielectric properties, includes forming the composition into a pellet, placing the pellet in a kiln or oven, and subjecting the pellet to a standard dielectric test and/or a standard insulation resistance test, while raising temperatures intermittently. While the pellet, if utilized in a TCO device, ideally meets or exceeds the aforementioned illustrative test protocol, it should be understood by those skilled in the art that the compositions are contemplated as being useful for both low and high voltage applications. Further, in certain aspects, the pellet compositions with substantial dielectric properties meet or exceed the Underwriters' Laboratory test UL1020 or IEC/EN 60691 standards, which are respectively incorporated herein by reference, see in particular Clauses 10.3 and 10.4 in Table 1, below. Notably, the maximum limit temperature ($T_{max}$) test protocol is also described in Clause 11.3 contained in Table 1. In other aspects, a test to assess dielectric performance can include forming the composition into a pellet, placing the pellet (in a TCO device) in a kiln or oven, where the kiln or oven has a pre-selected temperature above $T_f$, and subjecting the pellet to an increasing AC voltage until breakdown.

In certain embodiments, TCO devices comprised of the thermally pellet compositions have substantial dielectric properties and meet one or more of such standards at the pre-selected temperature rating for the device. While the performance criteria is fully outlined in each of these standards, salient aspects of performance tests that demonstrate conformance to the IEC 60691, Third Edition standard are summarized in Table 1.

TABLE 1

| | | |
|---|---|---|
| I | Clause 10.6 Current Interrupt Test: | |
| A | | Sample is placed in a kiln at rated functioning temperature minus 10° C. for three minutes. |
| B | | Sample is tested at 110% of rated voltage and 150% of rated current until sample interrupts the test current. |

TABLE 1-continued

| | | | |
|---|---|---|---|
| II | | Clause 10.7 Transient Overload (pulse) Test: | |
| | A | | Samples are place in the current path of D.C. current pulses, with an amplitude of 15 times rated current for a duration of 3 ms with 10 s intervals are applied for 100 cycles. |
| III | | Clause 11.2 Temperature Check ($T_f$): | |
| | A | | Samples are placed in an oven at rated functioning temperature minus 10° C. until stable, the temperature is then increased steadily at 0.5° C./minute until all samples are opened, recording the temperature of opening to pass +0/−5° C. |
| IV | | Clause 11.3 Maximum Limit Temperature ($T_{max}$): | |
| | A | | Samples are placed in a kiln at a specified temperature for 10 minutes, with the samples maintained at maximum limit temperature $T_{max}$ a dielectric test at a predetermined voltage (e.g., 500 Vac) with no breakdown, and an insulation resistance test at a predetermined voltage (e.g., 500 Vdc with a minimum of 0.2 MQ). |
| V | | Clause 11.4 Aging: | |
| | A | | Samples are placed in a kiln at a predetermined temperature for three weeks. At the conclusion of this test, at least 50% of samples shall not have functioned. |
| | B | | Samples are then placed in a kiln at rated functioning temperature minus 15° C. for three weeks. At the conclusion of this test, at least 50% of samples shall not have functioned. |
| | C | | Samples are then placed in a kiln at rated functioning temperature minus 10° C. for two weeks. |
| | D | | Samples are then placed in a kiln at rated functioning temperature minus 5° C. for one week. |
| | E | | Samples are then placed in a kiln at rated functioning temperature plus 3° C. for 24 hours. |
| | F | | Samples are then placed in a kiln at rated functioning temperature plus 3° C. for 24 hours. |
| | G | | This test is considered successful if all samples have functioned at the conclusion of step F. |
| VI | | Clause 10.3/10.4 Room Temperature Dielectric and Insulation Resistance: | |
| | A | | All test samples must complete and comply with a dielectric test at 500 Vac with no breakdown, and an insulation resistance test at 500 Vdc with a minimum of 0.2 MΩ. |

Example 1

In accordance with various aspects of the present disclosure, a pellet material composition for use in a TCO exhibiting improved aging performance, electrical performance, pellet output, pellet density and pellet crush strength due to the inclusion of tetraphenylsilane is formed as follows. A pellet is formed by mixing about 25.2 mg (97% of the pellet) of tetraphenylsilane (white solid, commercially available at 98% purity, Anhua); about 0.8 mg of additives of colorants, binders, and release agents (3% of the pellet). The mixture is then screened manually and mixed sufficiently and uniformly, followed by processing on a standard powder compaction in a pelletizing process.

The pelletizing process includes feeding powder through a gated powder flow control system and spread evenly over a rotary die table. The powder fills the dies (for the pellets) and punches/presses the powder in the dies under approximately 1 ton to 4 tons pressure to form a compacted powder pellet. Here, a density of the compacted pellet is 29 pellets per gram to 50 pellets per gram. Certain sample pellets are tested for structural and mechanical integrity, including measuring crush strength of the pellets, and the results are shown in Table 2 below. In addition, the pelletizing yields are measured and the results are shown in Table 3 below Next, the pellet is introduced into TCO Device 1 (a Therm-O-Disc X4 TCO device). The pellet is thus placed into a high-conductivity metal, closed-end cylinder with an inner diameter approximately the outer perimeter of the TCO pellet. The closed end of the cylinder is staked shut with an axial conductive metal lead protruding out of the cylinder. Other components are loaded atop the pellet in a stacked fashion depending on the end-use requirements of the TCO. A sub-assembly comprised of a non-conductive ceramic bushing with an axial bore hole and a conductive metal lead that has been inserted in the open bore and mechanically restrained into a permanent one-piece assembly by deformation of the metal lead is inserted into the open end of the TCO cylinder. The stacked components are compressed into the cylinder by the ceramic, isolated lead assembly and the rim of the open end of the cylinder is mechanically rolled over the ceramic bushing to permanently enclose the internal components in the TCO cylinder. An epoxy-type sealant is applied to the rolled over open end of the cylinder, the ceramic bushing and the base of the isolated lead. The assembled TCO is then cured for about 9 hours at 48° C.-60° C. under 0% RH to 85% RH.

The obtained TCO is tested for current interruption (CI) performance and the results are shown in Table 4 below (TCO rating G4/240 C, Test 1-1A, Test 1-1B, Test 2-1A, Test 2-1B). The obtained TCO is also tested for aging performance and the results are shown in Table 5 below.

Comparative Example 1

A pellet and a TCO are produced in the same manner as described above in Example 1, except that a current conventional thermal cutoff compound (caffeine) is used. Then the corresponding tests are carried out and the results are shown in Tables 2 to 5 below (TCO rating G4/240 C in Table 4, Control Group 1).

Example 2

A pellet is formed with the same ingredients and by the same process as described above in Example 1. The pellet is incorporated into Device 2 in the same manner that the pellet is incorporated into Device 1 in Example 1. Device 2 is a Therm-O-Disc X5 TCO device. The TCO device is tested for current interruption performance and the results are shown in Table 4 below (TCO rating G5/240 C, Test 3-1A, Test 3-1B, Test 4-1A, Test 5-1B).

Comparative Example 2

A pellet is formed in the same manner as in Example 1 (using a current conventional thermal cutoff compound), and then incorporated into Device 2 (Therm-O-Disc X5 TCO device). The TCO device is tested for current interruption performance and the results are shown in Table 4 below (TCO rating G5/240 C, Control Group 2).

TABLE 2

Pellet Crush Strength

| Current Conventional 240C Pellet | | Inventive 240C Pellet | |
|---|---|---|---|
| Sample # | Crush Strength (lbs) | Sample # | Crush Strength (lbs) |
| 1 | 12.9 | 1 | 14.1 |
| 2 | 15.4 | 2 | 18.5 |
| 3 | 11.2 | 3 | 16.7 |
| 4 | 11.6 | 4 | 16.2 |
| 5 | 10.7 | 5 | 15.4 |
| 6 | 12.4 | 6 | 15.8 |
| 7 | 10.4 | 7 | 17.3 |
| 8 | 10.7 | 8 | 15.3 |
| 9 | 10.5 | 9 | 16.2 |
| 10 | 13.1 | 10 | 14.0 |
| 11 | 10.4 | 11 | 15.8 |
| 12 | 11.7 | 12 | 14.7 |
| 13 | 12.4 | 13 | 16.2 |
| 14 | 13.0 | 14 | 14.6 |
| 15 | 13.9 | 15 | 14.5 |
| 16 | 13.5 | 16 | 14.6 |
| 17 | 11.0 | 17 | 16.9 |
| 18 | 11.2 | 18 | 17.6 |
| 19 | 8.9 | 19 | 16.0 |
| 20 | 12.3 | 20 | 18.1 |
| 21 | 13.9 | 21 | 15.9 |
| 22 | 10.8 | 22 | 16.9 |
| 23 | 10.8 | 23 | 15.5 |
| 24 | 14.8 | 24 | 14.0 |
| 25 | 9.4 | 25 | 14.4 |
| 26 | 11.2 | 26 | 16.6 |
| 27 | 12.3 | 27 | 14.8 |
| 28 | 13.6 | 28 | 15.3 |
| 29 | 11.1 | 29 | 13.4 |
| 30 | 12.9 | 30 | 14.2 |
| Average | 11.9 | Average | 15.7 |

It can be seen that the inventive 240 C pellet comprising tetraphenylsilane has an average crush strength of 15.7 lbs, which is increased by 31.9% as compared to that of the conventional 240 C pellet, which has an average crush strength of 11.9 lbs.

TABLE 3

Pellet Output

| | Current Conventional 240C Pellet | Inventive 240C Pellet | Inventive 240C Compound/Current Conventional 240C Compound (%) |
|---|---|---|---|
| Pellet Output (kpcs/hour) | 15.6 | 22.1 | 141.7% |

It can be seen that the output of the inventive 240 C pellet comprising tetraphenylsilane is increased by 41.7% as compared to that of the conventional 240 C pellet. The kpcs means 1,000 pieces of pellets.

TABLE 4

Current Interruption (CI) Performance

| TCO Ratings | Sample Group | Pellet | Parameter | Pass/Total | Pass (%) |
|---|---|---|---|---|---|
| G4/240C | Test 1-1A | Inventive 240C | 277VAC/17A | 20/20 | 100.0 |
| | Test 1-1B | | | 20/20 | 100.0 |
| | Test 2-1A | | 277VAC/19A | 20/20 | 100.0 |
| | Test 2-1B | | | 20/20 | 100.0 |
| | Control Group 1 | Current Conventional 240C | | 17/20 | 85.0 |

TABLE 4-continued

| Current Interruption (CI) Performance | | | | | |
|---|---|---|---|---|---|
| TCO Ratings | Sample Group | Pellet | Parameter | Pass/Total | Pass (%) |
| G5/240C | Test 3-1A | Inventive 240C | 277VAC/34A | 20/20 | 100.0 |
| | Test 3-1B | | | 20/20 | 100.0 |
| | Test 4-1A | | 277VAC/37.5A | 20/20 | 100.0 |
| | Test 4-1B | | | 20/20 | 100.0 |
| | Control Group 2 | Current Conventional 240C | | 16/20 | 80.0 |

It can be seen that in the TCO rating G4/240 C, the inventive 240 C TCO device comprising tetraphenylsilane has a CI performance improved from 277 VAC/17A to 277 VAC/19A with a pass rate of 100.0%, while the current conventional 240 C group TCO has a pass rate of 85.0%. In the TCO rating G5/240 C, the inventive 240 C TCO device comprising tetraphenylsilane has a CI performance improved from 277 VAC/34A to 277 VAC/37.5A with a pass rate of 100.0%, while the current conventional 240 C group TCO has a pass rate of 80.0%.

TABLE 5

| Aging Performance | | | | | |
|---|---|---|---|---|---|
| | | Inventive 240C Group | | Current Conventional 240C Group | |
| Sample Group Item | | Pellet Shrinkage (%) | TCO Open (Fail/Total) | Pellet Shrinkage (%) | TCO Open (Fail/Total)) |
| Aging time (by weeks) | at 2 weeks | 12.4% | (0/20) | 27.8% | (0/20) |
| | at 4 weeks | 13.6% | (0/20) | 31.3% | (0/20) |
| | at 5 weeks | 14.1% | (0/20) | 34.4% | (0/20) |
| | at 6 weeks | 14.2% | (0/20) | 35.0% | (0/20) |
| | at 7 weeks | 14.4% | (0/20) | 35.6% | (1/20) |
| | at 8 weeks | 14.5% | (0/20) | 35.9% | (3/20) |
| | at 9 weeks | 14.9% | (0/20) | Failed and test stopped | |
| | at 10 weeks | 15.1% | (0/20) | | |
| | at 11 weeks | 15.3% | (0/20) | | |
| | at 12 weeks | 15.5% | (0/20) | | |
| | at 13 weeks | 15.9% | (0/20) | | |
| | at 14 weeks | 16.8% | (0/20) | | |
| | at 15 weeks | 17.7% | (0/20) | | |
| | at 16 weeks | 18.5% | (0/20) | | |
| | at 17 weeks | 19.4% | (0/20) | | |
| | at 18 weeks | 20.8% | (0/20) | | |
| | at 19 weeks | 21.9% | (0/20) | | |
| | at 20 weeks | 22.7% | (0/20) | | |
| | at 21 weeks | 25.5% | (2/20) | | |
| | at 22 weeks | Failed and test stopped | | | |

It can be seen that, as compared to the current conventional 240 C TCO device, the inventive 240 C TCO device comprising tetraphenylsilane has a pellet shrinkage reduced from 35.0% to 14.2% at 6 week's aging, and an aging performance increased from about 6 weeks to more than 20 weeks.

In certain aspects, the present disclosure contemplates methods of forming the pellet composition. Such a method may first include admixing an organic compound including tetraphenylsilane and one or more additive components. Any of the components discussed above are contemplated here in these methods. The admixing may include homogenously admixing the components. The organic compound and the one or more additive components may be melted together (e.g., by being heated above the melting point of the various components) for the admixing process to form an admixture. The admixture is then cooled. Next, the admixture may be ground to form a powder. Then, the admixture is pelletized by introducing or flowing the powder into a pelletizer machine. The powder is then introduced into a die having a cavity in a shape that will form the pellet. The powder is compressed by applied pressure in the die (e.g., by a hydraulic press in the pelletizer machine) to form a solid pellet with an increased density.

The pellet material compositions can be manufactured into any commercially available form suitable for use inside a housing of a TCO, including granules, pellets, spheres and any geometric shape known to those in the art. See for example, the exemplary cylindrical-shaped pellet 25 shown in FIG. 2. Thus, the mixture may be processed into compacted shapes, such as pellets or granules, by application of pressure in a die or mold, by way of example. The structural integrity of pellets is desirably sufficient to withstand compressive forces of the TCO device, for example to withstand the applied force and bias to the TCO springs and encasement in a TCO assembly. By way of example, certain TCOs are capable of withstanding extended exposure to operating temperatures up to about 5° C. below the cutoff temperature without breaking the electrical continuity of the circuit.

In certain aspects, the admixture may omit a lubricant or reduce the amount of lubricant used to minimal levels (e.g., calcium stearate) due to the superior flowability of the powder formed by inclusion of tetraphenylsilane in the admixture during processing. Further, the solid pellet formed by such a process has an improved crush strength, for example, of greater than or equal to about 13 lbs for a predetermined and uniform surface area, optionally greater than or equal to about 14 lbs, optionally greater than or equal to about 15 lbs, optionally greater than or equal to about 16 lbs, optionally greater than or equal to about 17 lbs, and in certain variations, optionally greater than or equal to about 18 lbs.

Furthermore, as noted above, a yield during such a process of pelletizing and production is increased when using a material comprising tetraphenylsilane. For example, a yield of such a process, namely the final yield reflecting the proportion of defect-free pellets produced during the production process, may be greater than or equal to about 90%, optionally greater than or equal to about 91%, optionally greater than or equal to about 92%, optionally greater than or equal to about 93%, optionally greater than or equal to about 94%, optionally greater than or equal to about 95%, optionally greater than or equal to about 96%, optionally greater than or equal to about 97%, optionally greater than or equal to about 98%, optionally greater than or equal to about 99%, and in certain variations, 100%. In certain aspects, the pellet composition comprising tetraphenylsilane may achieve an output of greater than or equal to 16 kpcs/hour, optionally greater than or equal to 18 kpcs/hour, optionally greater than or equal to 20 kpcs/hour, optionally output greater than or equal to 22 kpcs/hour.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same embodiment may also be varied in many ways. Such variations are not to be regarded as a departure from the disclosure, and all such modifications are intended to be included within the scope of the disclosure.

The invention claimed is:

1. A thermal cutoff device comprising:

a thermal pellet comprising tetraphenylsilane having a cutoff temperature (Tf) of greater than or equal to about 230° C. disposed in a housing;

a seal disposed in a portion of at least one opening of the housing to substantially seal the housing up to the cutoff temperature (Tf); and a current interruption assembly at least partially disposed within the housing that establishes electrical continuity in a first operating condition corresponding to an operating temperature of less than the cutoff temperature (Tf) of the thermal pellet, and that discontinues electrical continuity when the operating temperature exceeds the cutoff temperature (Tf).

2. The thermal cutoff device of claim 1, wherein the thermal pellet comprises tetraphenylsilane at greater than or equal to about 80% by weight based on a total pellet weight.

3. The thermal cutoff device of claim 1, wherein the thermal pellet is in a solid phase and maintains its structural rigidity up to the cutoff temperature (Tf).

4. The thermal cutoff device of claim 3, wherein the cutoff temperature (Tf) is less than or equal to about 240° C.

5. The thermal cutoff device of claim 1, wherein the thermal pellet further comprises one or more additive components selected from the group consisting of: binders, lubricants, press-aids, pigments, and combinations thereof, wherein the one or more additive components are cumulatively present at less than or equal to about 20% by weight based on a total pellet weight.

6. The thermal cutoff device of claim 5, wherein the binders are present at about 1% to about 10% by weight based on the total pellet weight.

7. The thermal cutoff device of claim 1, wherein the thermal pellet comprises tetraphenylsilane at greater than or equal to about 90% by weight based on the total pellet weight.

8. The thermal cutoff device of claim 1, wherein the thermal pellet has an output of greater than or equal to about 16 kpcs/hour.

9. The thermal cutoff device of claim 1, wherein the thermal pellet has a crush strength of greater than or equal to about 13 lbs.

10. The thermal cutoff device of claim 1, which exhibits an aging performance by avoiding failure for greater than or equal to about 8 weeks.

11. The thermal cutoff device of claim 1, which exhibits an aging performance by avoiding failure for greater than or equal to about 20 weeks.

12. The thermal cutoff device of claim 1, wherein the thermal pellet comprises tetraphenylsilane at greater than or equal to about 80% by weight based on a total thermal pellet and one or more additive components cumulatively present at less than or equal to about 20% by weight based on the total thermal pellet.

13. The thermal cutoff device of claim 1, wherein the thermal cutoff device has an interruption current greater than or equal to 15 A at TCO rating G4/240 C, and an interruption current greater than or equal to 30 A at TCO rating G5/240 C.

* * * * *